T. F. WILSON.
VEHICLE TOP BOW CLAMP.
APPLICATION FILED JULY 12, 1915.
1,166,646.
Patented Jan. 4, 1916.
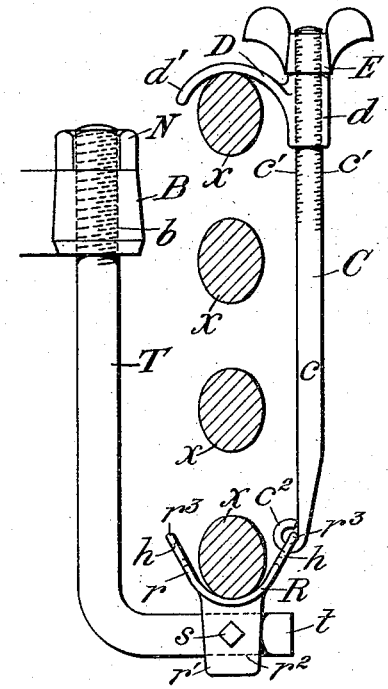
Fig. 1.
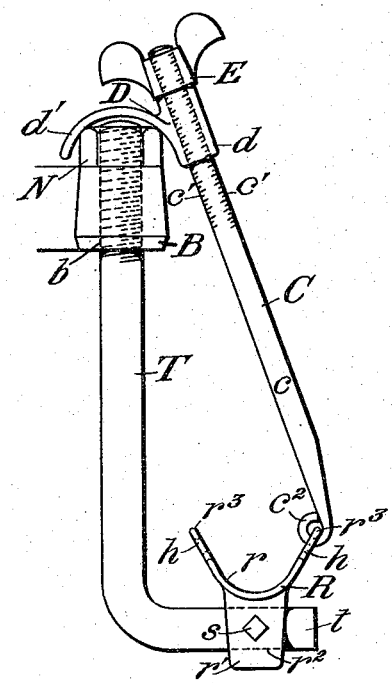
Fig. 2.
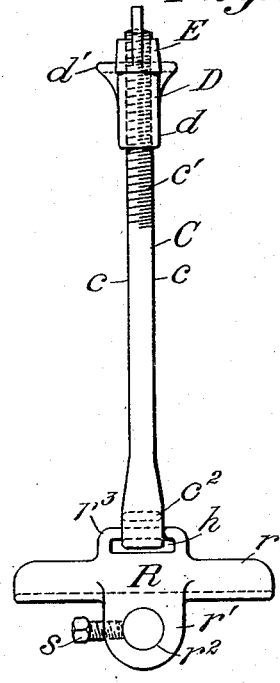
Fig. 3.
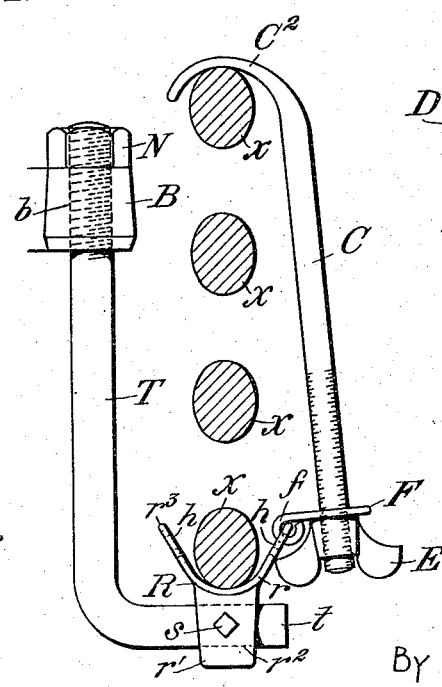
Fig. 5.
Fig. 4.
INVENTOR
Thomas F. Wilson
BY
Arthur F. Amington
ATTORNEY

UNITED STATES PATENT OFFICE.

THOMAS F. WILSON, OF CRANSTON, RHODE ISLAND.

VEHICLE-TOP-BOW CLAMP.

1,166,646.   Specification of Letters Patent.   Patented Jan. 4, 1916.

Application filed July 12, 1915. Serial No. 39,219.

*To all whom it may concern:*

Be it known that I, THOMAS F. WILSON, a citizen of the United States, residing at Cranston, in the county of Providence, State of Rhode Island, have invented certain new and useful Improvements in Vehicle-Top-Bow Clamps, of which the following is a specification.

My invention relates to clamping-devices for the top-bows of automobiles and other vehicles and consists of improvements in the construction and method of operation of the same.

The object of my improvement is to provide a bow-clamp of simplified construction comprising a minimum number of parts and adapted to be manufactured at a relatively slight cost.

A further object of my improvement is to provide a device which is universally attachable to the standard equipment supplied on practically all types of automobiles and which may be easily applied thereto without alteration or adjustment of the parts thereof.

In addition, my invention provides a most efficient means for clamping the top-bows together in closed relation to prevent vibration or chattering thereof; and my improved clamp is also adapted to be secured firmly to the side of the car when not in use, while the top is raised, in such manner as to avoid all unnecessary rattle or noise.

The invention is fully described in the following specification, illustrated by the accompanying drawings, in which like reference characters designate like parts.

In the drawings:—Figure 1 is an end elevation of my improved clamping-device showing it applied to the usual top-iron and bow-rest of the automobile and illustrating it in position to clamp the top-bows in closed relation; Fig. 2, a similar view showing the clamp secured against the top-iron in inoperative position when the top is raised; Fig. 3, a side view of the clamp showing the manner of attaching it to the bow-rest; Fig. 4, a detail view of the adjustable clamp-arm; and Fig. 5, a view illustrating a modified form of my improved clamp.

Referring first to Figs. 1 and 2, B designates the usual arm or bracket which projects from the side of the automobile body to provide means for securing the top-iron T thereto. The bracket B is generally provided with a threaded bore $b$ through which is screwed the end of the iron T with a nut N applied thereto to lock the parts together. The top-iron T is usually constructed in the form of a round rod bent at its lower end to provide a right-angled elbow-portion $t$ on which is supported the bow-rest R. This latter consists essentially of a trough-like flange or shelf $r$ formed on its under side with a lug $r'$ having a hole $r^2$ adapted to receive the elbow-portion $t$ of the iron T. A set-screw $s$ in the side of the lug $r'$ binds against the iron T to secure the rest R in fixed position thereon to adapt its shelf $r$ to receive the lower top-bow $x$ when the top is closed back on the rear of the car. Referring particularly to Figs. 1 and 3, the bow-rest R is usually provided with strap-holes $h$, $h$ on the sides of its shelf $r$ which normally receive the leather straps employed for securing the top-bows $x$, $x$, etc., in closed relation. As here illustrated the sides of the rest R are formed with upstanding ears $r^3$, $r^3$ pierced with the longitudinal slots or holes $h$, $h$, but my improved clamp is also adapted to be attached to practically any other style of bow-rest in which strap-holes are provided on its sides. It will be understood that the above described elements are common to substantially all types of automobiles and my invention is applied to use in connection therewith as follows:

My improved clamping-device comprises but three essential parts consisting of the clamp-rod or bar C, the clamp-arm D and the adjusting-nut E. The main clamp-member C is preferably constructed in the form of a rod, flatted along its opposite sides $c$, $c$ as shown in Fig. 3, and threaded at $c'$, $c'$ on its rounded sides throughout a portion of its length. At its lower end the rod C is spread out or widened in cross-section and bent around in a hook or loop $c^2$ which is adapted to be hooked into the slot $h$ of the rest R after the straps have been removed therefrom, and in this manner a hinged joint is effected between the clamp and the rest. Usually the loop $c^2$ is left slightly open to facilitate connecting the clamp C with the rest R and after it has been hooked into place it can be easily bent around and closed together as shown in Figs. 2 and 3 through the use of a pair of pliers.

Adapted to slide on the clamp-rod C is the clamp-arm D which is preferably formed with a hub or bearing $d$ from which projects the hooked extension $d'$.

Referring to Fig. 4, the hub $d$ is provided with the flat-sided hole $d^2$ adapted to receive the correspondingly-formed rod C and to slide freely over its threaded portion $c'$ without turning thereon. Screwed onto the end of the rod C is the thumb-nut E, preferably of the winged or "butterfly" type to adapt it to be easily adjusted by hand.

My improved clamp is sold to the user with the clamp-arm D and adjusting-nut E assembled on the rod C and all that is necessary to attach it to the vehicle is to remove the leather straps from the rest R and to then hook the end of the rod through the side-slot $h$. The loop $c^2$ is easily pinched together to secure the clamp permanently in its hinged relation to the rest R and the complete arrangement operates as follows: When the top is folded down onto the body of the vehicle, the bows $x$ are lowered into the position illustrated in Fig. 1 with the lowermost one supported on the rest R and the others in spaced relation above it. The clamp C is now swung into position to bring its arm D across the upper bow $x$ and the nut E is then screwed down against its hub $d$ to clamp the bows together against the rest R. Through this means the top-bows can be firmly held in place on the rest R to prevent them from vibrating or chattering and a particularly secure fastening is provided.

When the top is raised and the clamp is not in use, it is held in position by hooking the arm D over the top of the nut N and clamping it thereagainst by means of the thumb-nut E. In this manner the clamp can be held securely against rattling while inoperative, and at the same time is accessible for use when the top is lowered.

In Fig. 5 I have illustrated the parts of my improved device of slightly altered form, arranged in a somewhat different manner. In this embodiment of the invention the position of the rod C is reversed and its curved, upper end $C^2$ forms the clamp-arm for the upper top-bow $x$. Fitted to its lower, threaded end is a hinge-member F which is formed with a loop $f$ adapted to hook into the side opening or slot $h$ in the rest R, and the usual thumb-nut E is adapted to be screwed onto the rod C thereagainst. In this arrangement the parts operate in substantially the same manner as before explained, the nut E serving to draw the arm $C^2$ of the clamp-rod C down against the bows $x$ to bind them against the rest R. Likewise, the arm $C^2$ is adapted to be hooked over the top of the nut N on the top-iron T to secure the clamp in place when not in use.

It will be seen that my invention provides a most efficient device for the purpose intended embodied in a clamp which is universally applicable to practically all types of vehicles. In construction it is extremely simple and inexpensive to manufacture, with a minimum number of parts of relatively light weight, arranged for most convenient operation. It may be attached to the car in combination with the usual equipment supplied thereon and can be readily adjusted in position by any novice. At the same time the parts are staunch and strong enough to be proof against damage or getting out of order, and the whole arrangement presents an extremely neat and sightly appearance.

Various modifications other than those herein described might be made in the form and construction of the parts of my improved device without departing from the spirit or scope of the invention; therefore, without limiting myself to the exact embodiment shown and described,

What I claim is:—

1. In a bow-clamp for vehicle-tops, the combination of a rod formed with a hook at its lower end adapted to hook into the strap-hole of the usual top-rest of an automobile, an arm mounted to slide on the rod to adapt it to hook over a fixed support on the body of the automobile when the top is raised, or to embrace the upper bow of the top when the latter is in lowered position, and a thumb-nut adjustable on the rod to clamp the arm in either position in the manner and for the purpose substantially as described.

2. In a bow-clamp for vehicle-tops, the combination with the usual automobile top-iron secured in place with a nut on its upper end and a bow-rest on the iron having strap-holes in its side, of a clamp-member provided with a connecting-hinge at its lower end adapted to hook through one of the strap-holes in the rest, an arm projecting from the clamp-member to adapt it to hook over the nut on the top-iron when the top is raised and to embrace the upper bow when the top is lowered into closed position on the bow-rest, and manually-operable means for drawing said arm downwardly toward the bow-rest to secure the clamp in inoperative position against the top-iron or to clamp the top-bows in closed relation on the rest.

In testimony whereof I affix my signature in presence of two witnesses.

THOMAS F. WILSON.

Witnesses:
LILLIAN CORBETH,
HERBERT K. ALLARD.